United States Patent [19]

Williams et al.

[11] Patent Number: 4,938,425

[45] Date of Patent: Jul. 3, 1990

[54] HINGED FEED ROLL HOUSING

[75] Inventors: Terry A. Williams, Batavia; Raymond S. Wilkes, Ottumwa, both of Iowa

[73] Assignee: Deere & Company, Moline, Ill.

[21] Appl. No.: 75,458

[22] Filed: Jul. 20, 1987

[51] Int. Cl.$^5$ .................................................. B02C 18/22
[52] U.S. Cl. .................................. 241/101.7; 241/222; 241/285 B
[58] Field of Search ...................... 241/101.7, 290, 222, 241/241, 285 R, 285 A, 285 B

[56] References Cited

U.S. PATENT DOCUMENTS 4,043,514  8/1977  Peterson ...................... 241/285 B X

FOREIGN PATENT DOCUMENTS 656075  6/1986  Switzerland ................... 241/285 B
835487  6/1981  U.S.S.R. ........................ 241/285 A Primary Examiner—Mark Rosenbaum

[57] ABSTRACT

A forage harvester includes front and rear sets of upper and lower feed rolls that cooperate to convey a mat of crop material across a shear bar with which a cutterhead cooperates to cut the crop into short lengths. The front set of feed rolls and the upper feed roll of the rear set are contained in a feed roll housing including a movable frame section that is horizontally pivotally mounted to a fixed frame section, containing the cutterhead, shear bar and lower feed roll of the rear set of feed rolls, for movement between a normal working position and service position permitting easy access to the shear bar.

11 Claims, 3 Drawing Sheets

HINGED FEED ROLL HOUSING

BACKGROUND OF THE INVENTION

The present invention relates to forage harvesters and more specifically relates to combined feed roll and cutterhead assemblies of such harvesters.

Forage harvesters include a header which severs crop from the ground and delivers it rearwardly into the bite of a conveyor defined by upper and lower sets of counterrotating feed rolls which form the crop into a mat and delivers it across a shear bar where it is cut into short lengths by the blades of a cutterhead which rotates past the shear bar. The location of the feed rolls and shear bar is such that they are difficult to inspect, to repair, and/or to adjust. In one known forage harvester, the entire feed roll assembly is removed. Such removal is difficult and the re-installation of the assembly is even more difficult since it requires parts to be realigned for assembly. In another known forage harvester some of the feed rolls are mounted for pivoting up out of the way to gain access to the shear bar, but this becomes difficult in forage harvesters where the operator cabin is located above the feed roll and cutterhead assemblies and requires lifting heavy components.

SUMMARY OF THE INVENTION

According to the present invention there is provided a novel feed roll and cutterhead assembly constructed to simplify the tasks of inspecting and servicing the assembly.

An object of the invention is to provide a feed roll and cutterhead assembly designed to permit relatively easy access to the feed rolls and shear bar.

A more specific object of the invention is to provide a feed roll and cutterhead assembly wherein a first frame section supporting feed rolls is horizontally pivotally mounted to a second frame section supporting the cutterhead and shear bar whereby the first frame section may be pivoted so as to expose the shear bar.

These and other objects of the invention will be apparent from a reading of the ensuing description together with the appended drawing.

DESCRIPTION OF THE PREFERRED EMBODIMENT

Figure 1:
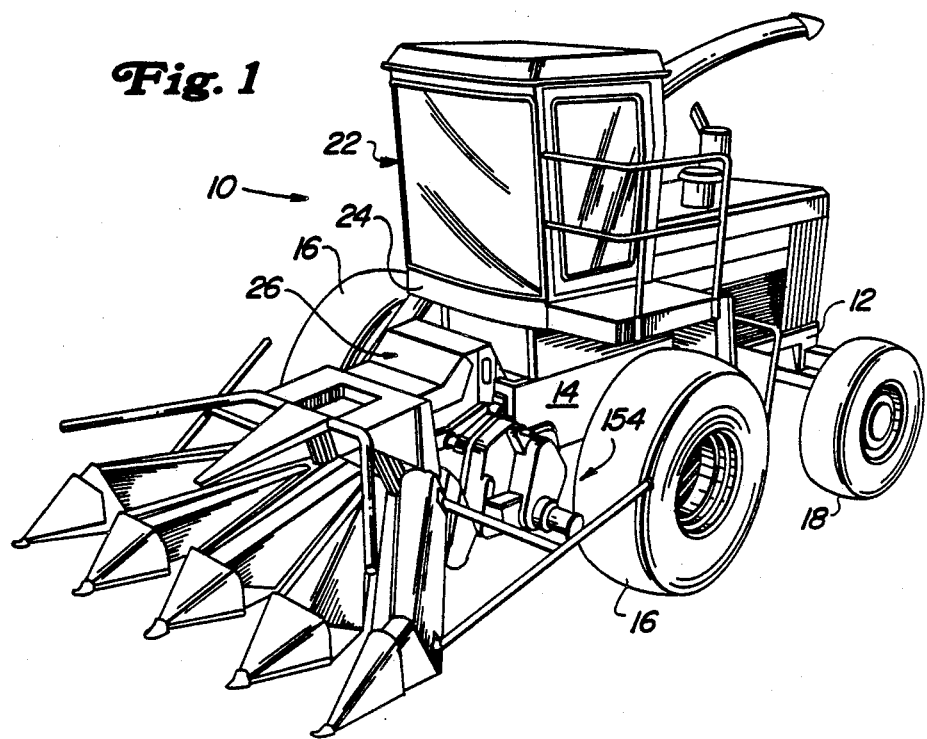
FIG. 1 is a left front perspective view of a self-propelled forage harvester with which the present invention is particularly adapted for use.

Referring now to the drawings, there is shown in FIG. 1 a forage harvester 10 which exemplifies the type of harvesting equipment with which the present invention is particularly adapted for use. While the harvester 10 is here shown as being self-propelled, it is to be understood that the invention could be applied to a towed forage harvester as well.

The forage harvester 10 includes a main frame 12 comprising a pair of transversely spaced, longitudinally extending beams 14 and being supported on a front pair of drive wheels 16 and on a rear pair of steerable wheels 18 (only one shown). The beams 14 have respective forward ends defined by a pair of vertical, transverse mounting plates 20. An operator's cab 22 is mounted to the beams 14 and includes a forward portion 24 which extends forwardly above the mounting plates 20.

Figure 4:
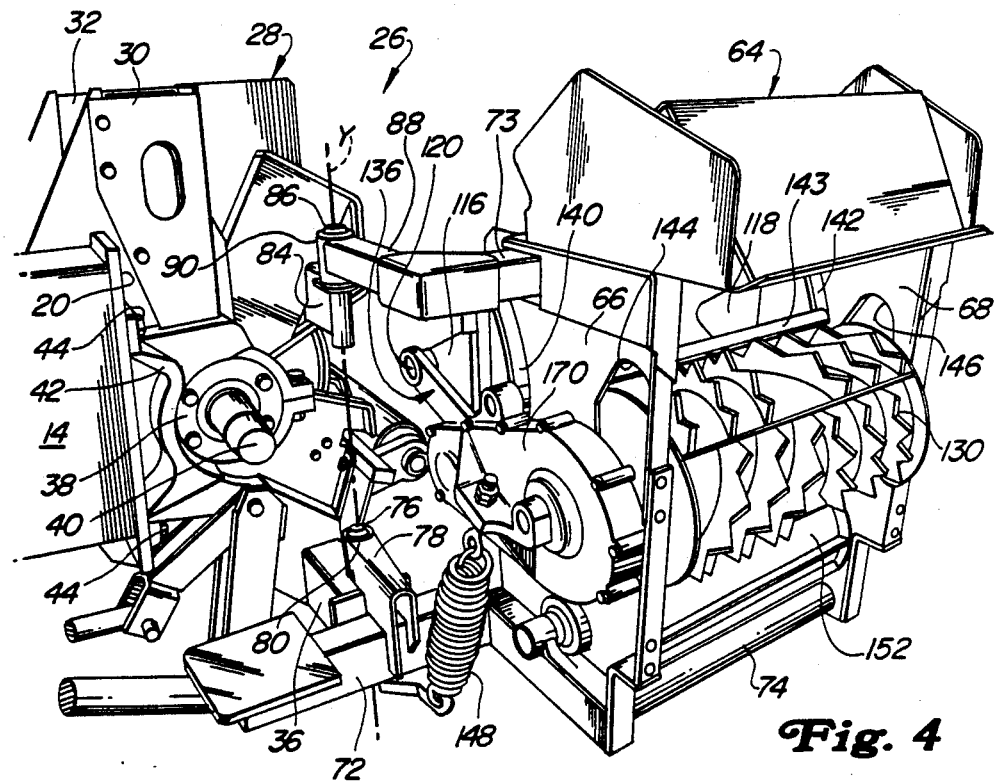
FIG. 4 is a right, somewhat perspective view of the structure shown in FIG. 3.
Figure 5:
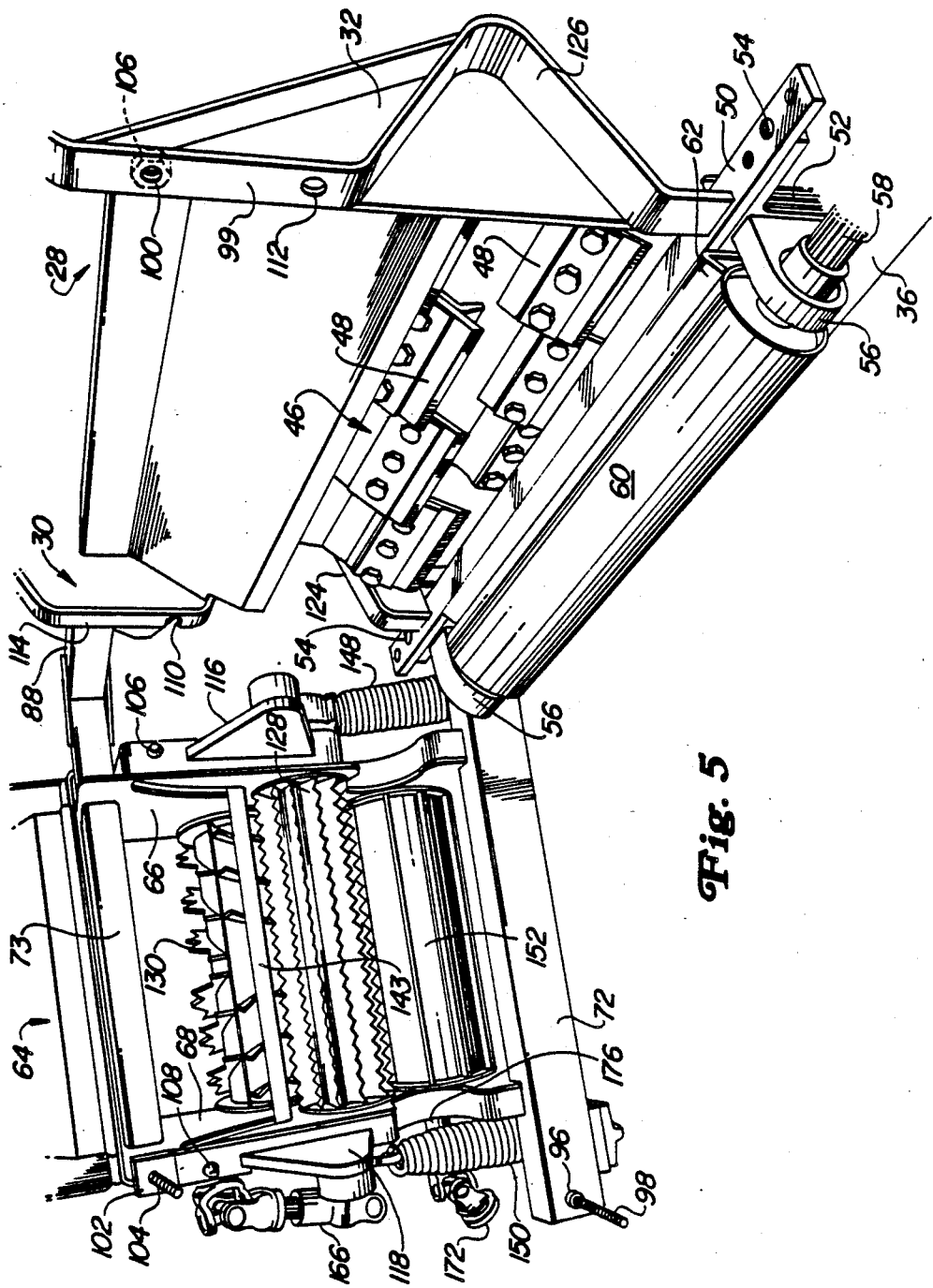
FIG. 5 is an enlarged view similar to FIG. 3 but omitting certain drive structure.

A combined cutterhead and feed roll assembly 26 is releasably secured to the forward end of the frame 12. Specifically, the assembly 26 includes a cutterhead frame 28 defined by right and left sidewalls 30 and 32 and by a cross member 36 formed by a tube that is rectangular in cross section and welded to lower forward locations of the sidewalls 30 and 32. A pair of shaft support bearing assemblies 38, one being shown in FIG. 4, are releasably secured to the sidewalls 30 and 32 and rotatably receive opposite end portions of a cutterhead shaft 40. A pair of circular bearing support clamp assemblies 42 are respectively bolted, as at 44, to the mounting plates 20 and are releasably clamped about the bearing assemblies 38. A cylindrical cutterhead 46 is located between the sidewalls 30 and 32 and is fixed for rotation with the shaft 40. The cutterhead 46 (FIG. 5) includes a cylindrical drum having a plurality of short knives 48 fixed to its exterior and having cutting edges which generate a cylinder as the cutterhead rotates and register with a shear bar 50 solidly supported by the cross member 36. Specifically, a knife bed 52 in the form of an upright bar is welded across a central portion of the cross member 36 and has an upper machined surface against which a lower surface of the shear bar 50 is clamped. The machined surface is preferably upwardly arched for the purposes set forth in U.S Pat. No. 4,506,839. The shear bar 50 and knife bed 52 extend laterally beyond the opposite sidewalls 30 and 32 and have aligned holes in the opposite ends thereof (only holes 54 of shear bar 50 being visible) provided for accepting respective shear bar adjusting mechanisms (not shown) like those disclosed in U.S. Pat. No. 4,190,209 for holding the shear bar 50 against the knife bed 52 and effecting adjustment of the shear bar 50 relative to the cutter head 46. A pair of bearing support brackets 56 are releasably secured to a forward surface of the knife bed 52 and rotatably receive opposite ends of a feed roll shaft 58 which supports a smooth, cylindrical feed roll 60 ahead of the shear bar 50. Also releasably and solidly mounted to the forward surface of the knife bed 52 is a vertical leg of a scraper 62 having an edge located proximate the surface of the feed roll 60 so as to ensure that all crop material passing over the feed roll will also pass over the shear bar. Thus, it will be appreciated that the ease of maintaining critical relationships between the shear bar 50 and cutterhead 46 and between the scraper 62 and feed roll 60 is facilitated by these parts being solidly mounted to fixed cross member 36.

Figure 2:
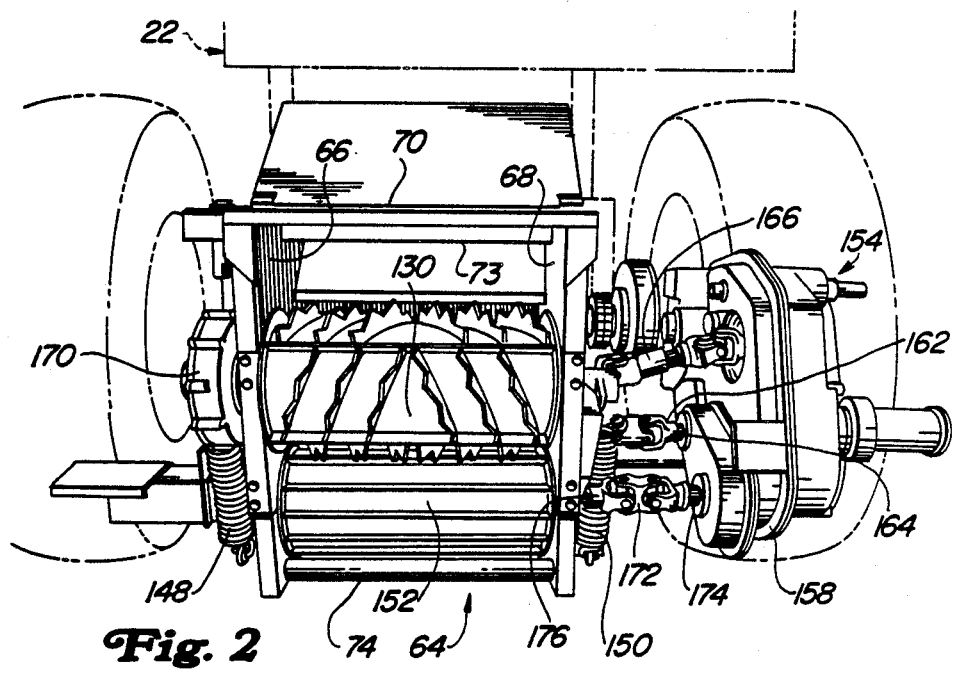
FIG. 2 is a front, somewhat perspective view of the feed roll and cutterhead assembly.
Figure 3:
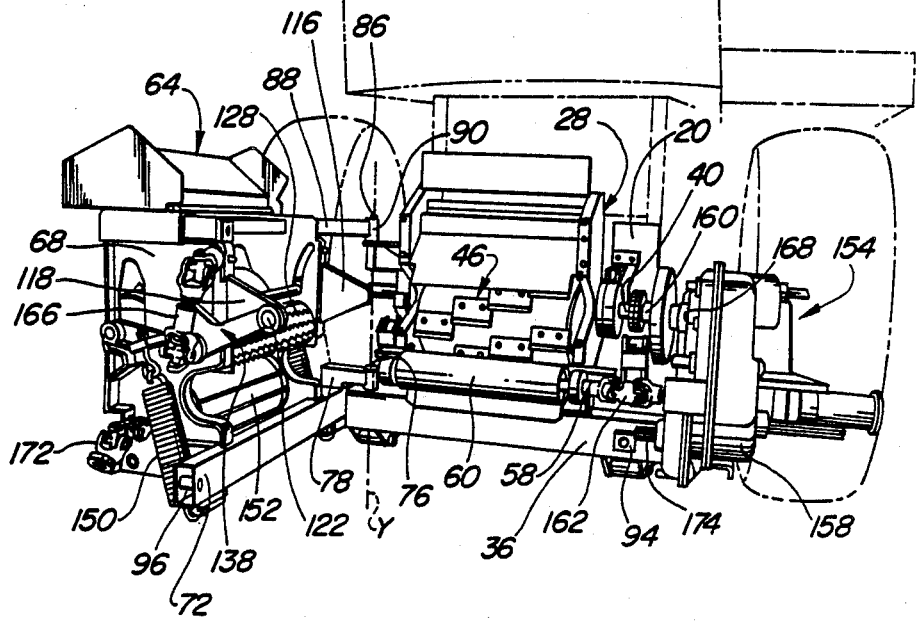
FIG. 3 is a front, somewhat perspective view of the structure shown in FIG. 1, but with the feed roll assembly shown pivoted horizontally to a position exposing the shear bar carried by the cutterhead assembly.

A feed roll housing or frame 64 is normally positioned in an operative position (FIG. 2) in fore-and-aft alignment with the cutterhead frame 28 and is horizontally pivotally connected to the right side of the frame 28 for being swung away from the latter to an open position (FIGS. 3–5) exposing the shear bar 50, feed roll 60 and scraper 62 for inspection, adjustment or replacement. Specifically, as considered in its operative position, the housing 64 includes right and left transversely spaced sidewalls 66 and 68 interconnected by a horizontal top member 70, upper and lower rear horizontal cross members 72 and 73, and a lower front horizontal cross member 74. The cross member 72 is similar to the cross member 36 in that it is formed by a tube that is rectangular in cross section. The cross member 72 is located so as to abut the cross member 36 when the housing 64 is in its operative position. A vertical pivot pin 76 is fixed to and projects upwardly from a right end location of the cross member 36. A rearwardly projecting bracket 78 is fixed to the cross member 72 at a location spaced rightwardly of the right sidewall 66 of the housing 64. Fixed to the rear end of the bracket 78 is a sleeve 80 in which is received upper and lower bushings (not shown) which, in turn, are received on the pivot pin 76. Elevated above the level of the cross member 36 is a bracket 84 which is fixed to and projects rightwardly from the sidewall 30 of the cutterhead frame 28. A vertical pivot pin 86 is fixed to and projects upwardly from the bracket 84 in axial alignment with the pivot pin 76 to define a vertical pivot axis Y. The cross member 73 projects rightwardly beyond the right sidewall 66 and has a rearwardly projecting bracket 88 joined thereto, the bracket carrying a sleeve 90 at its rear end. Located in the sleeve 90 are upper and lower bushings (not shown) which are received on the pivot pin 86. Located in a forward surface of the cutterhead cross member 36 at a location leftwardly of the sidewall 32 is a fore-and-aft extending hole (not visible) and a threaded nut 94 is welded to the member 36 in alignment with the hole. Provided in the cross member 72 of the feed roll housing 64 in alignment with the nut 74 is a through tube 96 receiving a connecting bolt 98 that is screwed into the nut 94. Located at an upper front location of a flange 99 forming the front of the cutterhead frame sidewall 32 is a fore-and-aft extending hole 100 which is aligned with a hole provided in a transverse tab 102 located at an upper rear location of the feed roll housing sidewall 68 and a bolt 104 is received through the holes and screwed into a nut 106 welded to the back side of the flange containing the hole 100. Respectively located at the back side of the sidewalls 66 and 68 at a level below that of the bolt 104 are right and left rearwardly projecting pilot pins 106 and 108 which have tapered rear ends and are respectively received in holes 110 and 112 provided in a transverse flange 114 forming a forward end portion of the sidewall 30 and in the transverse flange 99 of sidewall 32.

Secured to and forming rearwardly projecting portions of the feed roll housing sidewalls 66 and 68 are triangular support brackets 116 and 118, respectively, carrying outturned pivot pins 120 and 122. The brackets 116 and 118 overlap the cutterhead frame 28 when the feed roll housing 64 is in its operative position, with the bracket 116 closely fitting into an opening 124 provided in the sidewall 30 and with the bracket 118 closely fitting into a recess 126 formed in the sidewall 32. Located in the feed roll housing 64 are upper rear and front feed rolls 128 and 130, respectively, including transverse shafts having their opposite ends carried by right and left double arm assemblies 136 and 138 which include respective rearward radius arms vertically pivotally mounted on the pivot pins 120 and 122. A pair of arcuate slots 140 and 142 is respectively provided in the sidewalls 66 and 68 to permit movement of the shaft of roll 128 rotatably received in forward ends of and a leveler bar 143 rigidly joining the radius arms while a pair of openings 144 and 146 is respectively provided in the sidewalls 66 and 68 to permit movement of the shaft of roll 130 which has opposite ends rotatably received in forward ends of a pair of forward arms of the arm assemblies. Right and left springs 148 and 150 are respectively coupled between the arm assemblies 136 and 138 and locations adjacent opposite ends of the housing cross member 72. The springs 148 and 150 act to bias the upper rear and front feed rolls 128 and 130 respectively towards the fixed feed roll 60 carried by the cutterhead frame 28 and a lower front fixed feed roll 152 including a shaft 154 having its opposite ends rotatably supported by the sidewalls 66 and 68. The arm assemblies 136 and 138 are quite similar to those disclosed in U.S. Pat. No. 4,192,468 and reference may be made to this patent for details of the operation of the arm assemblies. Suffice it to say that the movable feed rolls 128 and 130 cooperate with the fixed feed rolls 60 and 152 so as to deliver a mat of crop material across the shear bar 50 for being cut into short lengths by the cutterhead 46.

Power for driving the cutterhead and the various feed rolls is fed through a reversible transmission 154 supported outboard of the left side of the cutterhead and feed roll assembly 26 by a left end portion of the cross member 36 and other structure joined to the cutterhead frame 28. The transmission 154 includes a housing 158 in which is supported various gear and chain drives (not shown). A first power shaft 160 (FIG. 3) of the transmission is coupled to a leftward extension of the cutterhead shaft 40. A first double U-joint connector 162 is coupled between a second transmission power shaft 164 (FIG. 2) and a leftward extension of the shaft 58 of the feed roll 60. A second double U-joint 166 is releasably coupled between a third transmission power shaft 168 (FIG. 3) and a leftward extension of the shaft of the upper rear feed roll 128. A chain drive located within a housing 170 forming part of the right double arm assembly 136 is coupled to cause rotation of the upper front feed roll 130. A third double U-joint 172 is releasably coupled between a fourth transmission power shaft 174 and a leftward extension of a shaft 176 of the lower front fixed feed roll 152.

Thus, it will be appreciated that if one desires to gain access to the shear bar 50 and associated elements, this can be done by merely removing the bolts 98 and 104, disconnecting the double U-joints 166 and 172 and pivoting the feed roll housing 64 forwardly, to its open position (FIG. 3) about the vertical pivot axis Y defined by the pivot pins 76 and 86. The feed roll housing 64 may be returned to its operative position (FIG. 2) by pivoting the housing 64 back against the cutterhead frame 28 whereupon the pilot pins 106 and 108 will enter holes 110 and 112 and effect proper alignment of the holes and nuts for receiving the bolts 98 and 104. The bolts 98 and 104 are then installed and the U-joints 166 and 172 reconnected.

We claim:
1. In a combined feed roll and cutterhead assembly for a forage harvester having a support frame including first and second transversely spaced sidewalls rotatably supporting a cutterhead, adjustably supporting a shear bar in fixed relationship to the cutterhead and supporting at least one set of upper and lower feed rolls ahead of the cutterhead for feeding a crop mat across the shear bar for being cut into lengths by the cutterhead, the improvement comprising: said support frame including a fixed section containing the cutterhead and a selectively movable section containing said at least one set of upper and lower feed rolls; hinge means coupled between the fixed and movable sections of the frame and establishing a vertical pivot axis transversely outwardly of the first sidewall about which the movable section may pivot from a working position, wherein the feed rolls extend parallel to and are disposed ahead of the shear bar and cutterhead, to a service position permitting access to the shear bar, and fastener means releasably securing the movable frame section to the fixed frame section for retaining the movable frame section in its working position.

2. The combined feed roll and cutterhead assembly defined in claim 1 wherein said fixed frame section includes a transverse cross beam and said shear bar being mounted to said transverse cross beam.

3. The combined feed roll and cutterhead assembly defined in claim 1 wherein said at least one set of upper and lower feed rolls forms a forward set of feed rolls; and said assembly further including a rearward set of upper and lower feed rolls defined by an upper rear feed roll contained in said movable frame section and a lower rear feed roll contained in said fixed frame section with the rearward set of feed rolls being disposed for receiving crop delivered by the forward set of feed rolls and for delivering crop across said shear bar.

4. The combined feed roll and cutterhead assembly defined in claim 3 wherein said fixed frame section includes a transverse cross beam and said shear bar and lower rear feed roll being mounted to said transverse cross beam.

5. The combined feed roll and cutterhead assembly defined in claim 4 wherein said lower rear feed roll has a smooth, cylindrical surface, and a scraper being mounted to said transverse cross beam and having an edge located for stripping crop from said cylindrical surface.

6. The combined feed roll and cutterhead assembly defined in claim 1 wherein said fixed frame section includes a lower front cross beam having an upright front surface and said movable frame section includes a lower rear cross beam having an upright rear surface which engages said upright front surface when the movable frame section is in its working position; and said fastener means including means extending into the lower front and rear cross beams and releasably securing them together.

7. The combined feed roll and cutterhead assembly defined in claim 6 wherein the said first and second transversely spaced sidewalls are defined by movable and fixed pairs of sidewall sections respectively forming portions of said movable and fixed frame sections with upright rearwardly facing surfaces of the movable pair of sidewall sections engaging upright forwardly facing surfaces of the fixed pair of sidewall sections when the movable frame section is in its working position; and said releasable fastener means including means extending through and holding together the engaged upright surfaces of the second sidewall.

8. The combined feed roll and cutterhead assembly defined in claim 7 wherein said upright forwardly facing surfaces of the fixed sidewall sections are each provided with a pilot hole; and said upright rearwardly facing surfaces of the movable sidewall sections each being provided with a pilot pin extending into an adjacent one of the pilot holes when the movable frame section is in its working position.

9. The combined feed roll and cutterhead assembly defined in claim 1 wherein said hinge means includes a pair of vertically spaced, axially aligned pins carried by said fixed section of the support frame and a pair of vertically spaced, axially aligned, pin receptacles carried by said movable section of the support frame and respectively received on said pair of pins.

10. In a self-propelled forage harvester having a wheel-supported main frame including a pair of parallel, transversely spaced fore-and-aft extending beams, a feed roll and cutterhead assembly having a support frame mounted to a forward end portion of the main frame and including first and second transversely spaced sidewalls rotatably supporting a cutterhead and supporting at least one set of upper and lower feed rolls in front of and in parallel relationship to the cutterhead, and a shear bar being supported between the at least one set of feed rolls and the cutterhead, the improvement comprising: said support frame including a fixed section containing said cutterhead and a movable section containing said at least one set of upper and lower feed rolls; a pivot structure interconnecting the fixed and movable sections at a location spaced outwardly from said first sidewall and defining a vertical pivot axis about which the movable section may pivot to a service position providing access to said shear bar; and releasable fastener means releasably retaining said movable section in a working position wherein the feed rolls extend parallel to the shear bar and cutterhead.

11. The self-propelled forage harvester defined in claim 10 wherein said cutterhead includes a shaft extending through the first and second sidewalls, said fixed section including a pair of bearing housings being respectively secured to said first and second sidewalls and rotatably supporting said shaft, said pair of beams respectively having forward ends defined by a pair of vertical transverse plates; and a pair of mounting clamps respectively engaging said pair of bearing housings and being respectively releasably secured to said pair of transverse plates.

* * * * *